United States Patent
Baldinger et al.

(10) Patent No.: US 12,246,505 B2
(45) Date of Patent: Mar. 11, 2025

(54) METHOD OF MANUFACTURING A CUSHION

(71) Applicant: BLUE DANUBE ROBOTICS GMBH, Vienna (AT)

(72) Inventors: Andreas Baldinger, Vienna (AT); Tobias Ferner, Vienna (AT); Michael Zillich, Vienna (AT); Walter Wohlkinger, Vienna (AT)

(73) Assignee: BLUE DANUBE ROBOTICS GMBH, Vienna (AT)

( * ) Notice: Subject to any disclaimer, the term of this patent is extended or adjusted under 35 U.S.C. 154(b) by 812 days.

(21) Appl. No.: 17/275,439

(22) PCT Filed: Sep. 12, 2019

(86) PCT No.: PCT/AT2019/000029
§ 371 (c)(1),
(2) Date: Mar. 11, 2021

(87) PCT Pub. No.: WO2020/051602
PCT Pub. Date: Mar. 19, 2020

(65) Prior Publication Data
US 2022/0048268 A1 Feb. 17, 2022

(30) Foreign Application Priority Data
Sep. 13, 2018 (AT) .................................. A 289/2018

(51) Int. Cl.
*B29D 99/00* (2010.01)
*B25J 19/00* (2006.01)
(Continued)

(52) U.S. Cl.
CPC ...... *B29D 99/0092* (2013.01); *B25J 19/0075* (2013.01); *B25J 19/0091* (2013.01); *B25J 19/06* (2013.01); *B29K 2075/00* (2013.01)

(58) Field of Classification Search
CPC .............. B29C 45/005; B29C 44/1228; B29C 44/1223; B29C 43/30; B29C 43/28;
(Continued)

(56) References Cited

U.S. PATENT DOCUMENTS 4,874,640 A   10/1989   Donzis

FOREIGN PATENT DOCUMENTS

DE    1939203    *   8/1970
DE    1939203 A1    8/1970
(Continued)

OTHER PUBLICATIONS

International Preliminary Report on Patentability dated Dec. 18, 2020, issued in corresponding International Application No. PCT/AT2019/000029 (20 pgs.).
(Continued)

*Primary Examiner* — Stella K Yi
(74) *Attorney, Agent, or Firm* — Pillsbury Winthrop Shaw Pittman, LLP (57) ABSTRACT

Method for producing a cushion with a casing made of an airtight casing material and a flexible, polydirectionally air-permeable filling body which is arranged in the casing and which is materially connected to the casing. The method includes at least the following steps: coating a first mold cavity of a molding tool with a curable, flowable and/or sprayable plastic material to form a first casing shell, coating a second mold cavity of the molding tool with the curable, flowable and/or sprayable plastic material to form a second casing shell, inserting a pre-produced filling body into the first casing shell located in the first mold cavity, and joining together of the first and second casing shells located in the first mold cavity and in the second mold cavity before the plastic material cures or fully reacts.

12 Claims, 7 Drawing Sheets

(51) Int. Cl.
*B25J 19/06* (2006.01)
*B29K 75/00* (2006.01)

(58) Field of Classification Search
CPC ............ B29C 43/184; B29C 2043/147; B29C 51/004; B29C 70/34; B29C 70/305; B29C 70/30; B29C 2049/4881; B29C 66/436
See application file for complete search history.

(56) References Cited

FOREIGN PATENT DOCUMENTS

| | | | |
|---|---|---|---|
| DE | 10344266 A1 | | 4/2005 |
| EP | 0149862 A1 | | 7/1985 |
| EP | 0386818 A1 | | 9/1990 |
| EP | 3028589 A1 | | 8/2016 |
| EP | 3222394 A2 | | 9/2017 |
| GB | 1538521 | | 1/1979 |
| RU | 797891 | * | 1/1981 |
| WO | 2008/101362 A1 | | 8/2008 |
| WO | 2008101362 | * | 8/2008 |
| WO | 2016/000005 A1 | | 1/2016 |

OTHER PUBLICATIONS

International Search Report dated Nov. 29, 2019, issued in corresponding International Application No. PCT/AT2019/000029 with English translation (6 pgs.).

* cited by examiner

METHOD OF MANUFACTURING A CUSHION

CROSS-REFERENCE TO RELATED APPLICATIONS

This application is the US national stage entry of PCT/AT2019/000029, filed Sep. 12, 2019, which claims priority to Austrian Patent Application No. A 289/2018, filed Sep. 13, 2018, the entire contents of both of which are herein incorporated by reference in their entireties.

The invention relates to a method for producing a cushion with a casing made of an airtight casing material and a flexible, polydirectionally air-permeable filling body arranged in the casing, as well as a corresponding cushion.

A cushion similar to the type mentioned above is described, for example, in WO 2016/000005 A1 and serves as a tactile safety sensor to protect people and stationary or autonomously moving obstacles from stationary or autonomously moving handling devices, in particular industrial robots, such as manufacturing, transport, inspection or service robots and their manipulators. For collision detection, the safety sensor or a plurality of such safety sensors or cushions are attached to the handling device and/or to its manipulators. The safety sensor described in WO 2016/000005 A1 essentially comprises an airtight casing or envelope which encloses a gas- or air-filled chamber and an internal barometric pressure sensor.

The shape of the casing is maintained by a flexible support structure or a filling body, the filling body and the casing together forming the body of the sensor or cushion. The filling body ensures dimensional stability and mechanical damping of the forces acting in a collision. Touching the sensor leads to a deformation of the casing, but the casing cannot evade at points different from the point of contact, since the filling body is materially connected to the casing. This results in a measurable increase in pressure inside the casing. A pressure increase above a certain threshold value leads to the stopping of the handling device to be secured, on the surface of which the sensor is attached.

While cushion or safety sensors of the type just described are already in commercial use, their extremely complex production now represents a main problem with further and, above all, inexpensive distribution and application. As already mentioned, it is of essential importance that the casing and the filling body are in material and/or form-fitting connection with one another, since without this fact the shell could give way when touched or compressed at a point different from the point of contact, whereby the pressure increase in the cushion that is necessary for the detection of a collision would not occur.

In order to achieve the material and/or form-fitting connection between the casing and the filling body, the cushions of the type mentioned were previously produced by means of 3D printing processes, in which the casing and then the filling body that is connected to the casing were printed layer by layer. This is very time-consuming and costly and it is to be feared that the need for safety sensors to protect people and stationary or autonomously moving obstacles from stationary or autonomously moving handling devices, in particular industrial robots, such as manufacturing, transport, inspection or service robots and their manipulators cannot be meaningfully covered in the long term with cushions made in this way.

It is therefore the object of the present invention to specify a manufacturing method with which the manufacture of cushions or safety sensors by means of 3D printing methods can be replaced by a faster, more cost-effective, but at the same time reliable manufacturing method.

To solve this problem, the method for producing a cushion with a casing made of an airtight casing material and a flexible, polydirectionally air-permeable filling body arranged in the casing, which is materially and/or positively connected to the casing, is characterized according to the invention by at least the following steps:

coating a first mold cavity of a first molding tool with a curable, flowable and/or sprayable plastic material to form a first casing shell,     coating a second mold cavity of a second molding tool with the curable, flowable and/or sprayable plastic material to form a second casing shell,     inserting a pre-produced filling body into the first casing shell located in the first mold cavity,     joining together of the first and second casing shells located in the first mold cavity and in the second mold cavity before the plastic material cures or fully reacts.

Because the casing is formed in the form of two casing shells in molding tools by coating the mold cavities with a curable, flowable and/or sprayable plastic material and a preproduced filling body is inserted before the two half-shells are put together, production is relatively quick and easy with low expenditure on equipment. At the same time, the fact that the filling body is inserted before the curable, flowable and/or sprayable plastic material cures and the plastic material can penetrate the filling body over its entire surface and can only subsequently cure, creates a solid material connection between the preferably elastic casing material and the filling body, which prevents undesired deformation of the cushion at a point different from the point of contact or collision.

In the method according to the invention, the filling body can be produced using relatively simple and tried and tested methods, since an airtight casing does not yet have to be formed on the outside of the filling body. For example, the filling bodies can be foamed as open-pore foams and rigid foams or thermoformed from open-pore foam or cut from a three-dimensional knitted fabric and made available in bulk. It is also possible to foam the foam, cut it to size or reshape it immediately before inserting it.

It is essential that the flexible filling body is polydirectionally air-permeable in order to ensure a uniform pressure increase in the cushion in the event of a collision regardless of the point of contact. The filling body suitable in this way is then introduced into the not yet cured casing shell and covered by the second casing shell. The curable, flowable and/or sprayable plastic material penetrates to a certain extent into the porosity or into the knitted fabric and materially connects and/or positively connects with the filling body.

The method according to the invention makes use of known, flowable and/or sprayable plastic materials or systems which can be cured by polymerization and can therefore be well controlled chemically. The coating and curing take place within a few minutes, so that a high cycle frequency is made possible in the manufacture of cushions for the application mentioned at the beginning.

According to a preferred embodiment of the present invention, the first mold cavity and the second mold cavity are coated with the plastic material by means of high pressure spraying. High-pressure spraying allows the uniform application of layers of said curable, flowable and/or sprayable plastic material to the surface of the mold cavity of a molding tool, wherein the curable, flowable and/or sprayable plastic material is initially soft and there is just enough time left to insert or place the filling body and to put the second casing shell, which is also not yet cured, thereon.

Polyurethane is preferably used as the plastic material. Polymerization systems based on urethane are characterized by low costs and low toxicity and can be easily provided and applied to the mold cavities. In particular, it is possible to apply urethanes to the mold cavities by high-pressure spraying, so that the present invention makes it possible to produce casings or casing shells with a uniform thickness and constant quality.

To introduce the filling body into the casing shell, it is provided according to a preferred embodiment of the present invention that the filling body is pressed into one of the casing shells with a molding tool for the filling body when it is inserted into the first casing shell. This means that the filling body is produced at the production site of the casing or the casing shells in a molding tool and the molding tool for the filling body is used at the same time as a tool for inserting the filling body into the casing shell. The filling body can, however, also be pressed into one of the casing shells with a tool specially provided for this purpose. The molding tool for the filling body can preferably be moved by a stationary or autonomously moving handling device, in particular an industrial robot such as a manufacturing robot, in order to insert the filling body into the first casing shell. The filling body is pressed into the not yet cured plastic material of the first casing shell to ensure penetration of the plastic material into the outermost areas of the filling body, but the layer thickness of the plastic material in the mold cavity and the contact pressure of the filling body onto the not yet cured plastic material are adjusted such that the filling body is in no way impregnated with the not yet cured plastic material which would impair its polydirectional air permeability.

As already mentioned, a cushion or air cushion for use as a safety sensor in stationary or autonomously moving handling devices or robots is equipped with at least one pressure sensor arranged inside the casing and with corresponding evaluation electronics to detect contact or collision and to be able to output a corresponding control signal. The cushion or the safety sensor must therefore have appropriate built-in components. While in WO 2016/000005 A1 these built-in components were still accommodated in a base shell made of plastic (reference number 12 in FIG. 1 of WO 2016/000005 A1), this has in the meantime been changed to integrate these built-in components directly into the casing shell of the cushions or safety sensors, i.e. to produce corresponding built-in parts or housing parts for electronic devices directly with the casing. In the context of the present invention, this can be achieved in a particularly advantageous manner if, in accordance with a preferred embodiment of the present invention, before coating the first mold cavity with the plastic material, at least one prefabricated insert is placed in the molding tool for embedding said at least one insert in the casing shell during coating. The inserts can be produced on-site or provided by a supplier and are independent of the method according to the invention in terms of their production, as long as they do not prevent a material and/or form-fitting connection with the selected plastic material of the casing.

A housing or carrier part for electronic components, a mechanical connecting and/or fastening element and/or a cable clamp is preferably embedded as the at least one insert.

In order to ensure an airtight and mechanically durable connection of the at least one insert with the casing, the at least one insert has a flat fastening region through which the curable, flowable and/or sprayable plastic material penetrates, as is the case with a preferred embodiment of the present invention. For this purpose, the fastening region can have a porous or network-like structure that can be penetrated by the curable, flowable and/or sprayable plastic material, whereby there is either a material connection between the curable, flowable and/or sprayable plastic material or wherein the insert is held in a form-fitting manner by the curable, flowable and/or sprayable plastic material, or both types of connection, material and form-fitting, are achieved.

The integration of the at least one insert is best when the at least one insert has a sealing region that is raised with respect to the fastening region and the curable, flowable and/or sprayable plastic material penetrates the fastening region up to the level of the sealing region.

In order to further improve the integration of the at least one insert and in particular to promote a material connection between the preferably elastic casing material and the at least one insert, it is provided according to a preferred embodiment of the present invention that the at least one insert, before coating, is subjected to at least one process selected from heating, scarfing and plasma treatment. This serves to make the surface, in particular of the sealing region of the at least one insert, more accessible to a material connection with the casing material, which is immediately understandable in the manufacture of the casing, especially when using thermoplastics as curable, flowable and/or sprayable plastic material. The mentioned treatments of the inserts, however, also prove to be advantageous with the preferred choice of polyurethane as the curable, flowable and/or sprayable plastic material, which applies in particular to the plasma treatment.

In order to prevent the inserts from slipping when the mold cavities are coated with the curable, flowable and/or sprayable plastic material, the method according to the invention is preferably developed in such a way that the inserts are held in place by the effect of negative pressure prior to coating. The inserts can be specially shaped for this so that the negative pressure can be easily built up and maintained until the plastic material has hardened and the inserts are firmly anchored in the casing. The method according to the invention can preferably be developed in such a way that the inserts consist at least partially of metal and are held in place by the action of magnets, in particular electromagnets, before coating.

The negative pressure is preferably formed by negative pressure lines passing through the molding tool.

According to a preferred embodiment of the present invention, after the plastic material has cured, a seam made of excess plastic material is separated from the cushion by means of compressed air.

The cushion according to the invention with a casing made of an airtight casing material and a flexible, polydirectionally air-permeable filling body arranged in the casing, the filling body being materially connected to the casing, is characterized in that the casing is produced by coating a mold cavity of a molding tool with a curable, flowable and/or sprayable plastic material. The cushion or safety sensor according to the invention for protecting people and stationary or autonomously moving obstacles from stationary or autonomously moving handling devices, in particular industrial robots, such as manufacturing, transport, inspection or service robots and their manipulators can therefore be mass-produced and offered at low cost.

The casing is preferably made of polyurethane. Polyurethanes are characterized by low costs and enable the production of casings or casing shells with a uniform thickness and constant quality.

As already mentioned, a cushion or air cushion for use as a safety sensor in stationary or autonomously moving handling devices or robots is equipped with at least one pressure sensor and corresponding evaluation electronics in order to be able to detect contact or collision and output a corresponding control signal. The cushion or safety sensor according to the invention is therefore developed in such a way that at least one insert is materially and/or positively connected to the casing, as corresponds to a preferred embodiment of the present invention. The inserts can be manufactured on-site or provided by a supplier.

The at least one insert is preferably a housing or carrier part for electronic components, a mechanical connecting and/or fastening element and/or a cable clamp.

In order to ensure an airtight and mechanically durable connection of the at least one insert to the casing, the at least one insert has a flat fastening region through which the curable, flowable and/or sprayable plastic material penetrates, as in accordance with a preferred embodiment of the present invention. For this purpose, the fastening region has a porous or network-like structure that can be penetrated by the curable, flowable and/or sprayable plastic material, whereby there is either a material connection between the curable, flowable and/or sprayable plastic material or wherein the insert is held in a form-fitting manner by the curable, flowable and/or sprayable plastic material, or both types of connection, material and form-fitting, are achieved.

The invention is explained in more detail below with reference to an exemplary embodiment schematically shown in the drawing. Therein.

Figure 1:
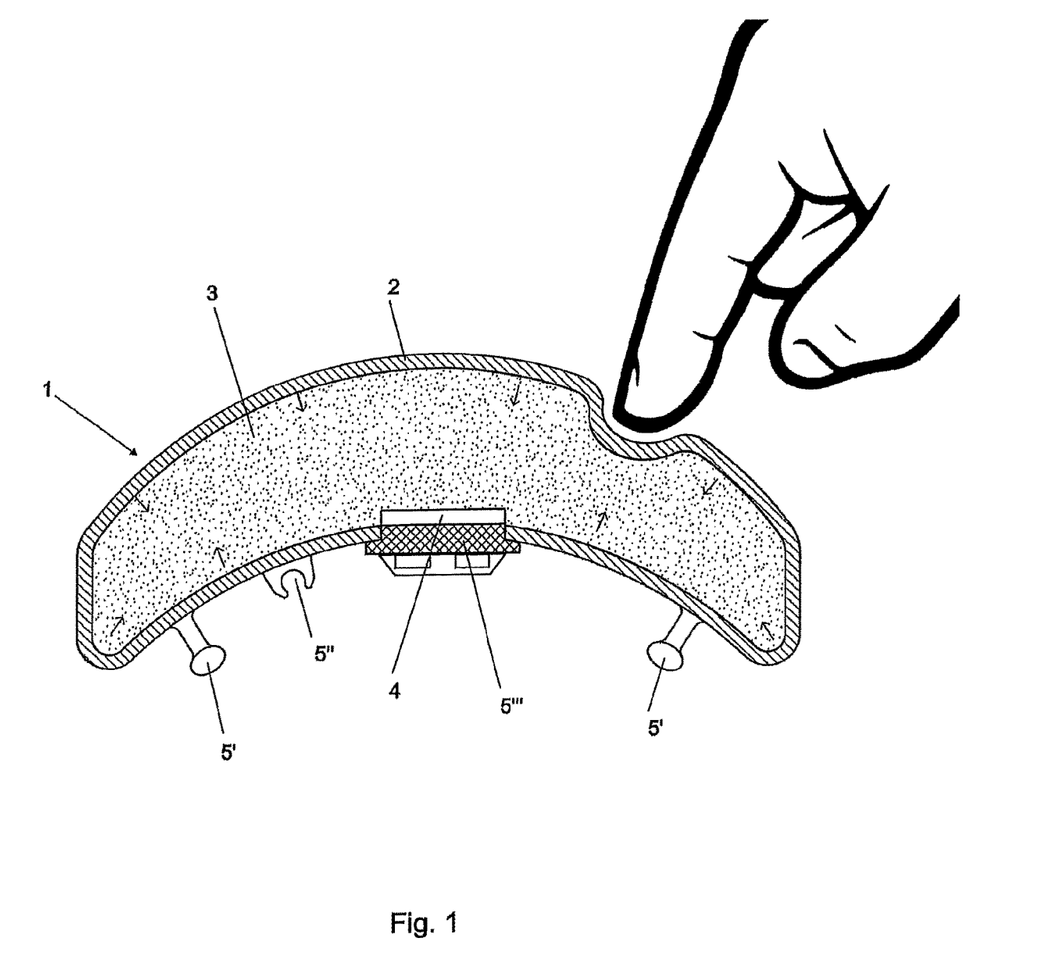
FIG. 1 shows a representation of a cushion or safety sensor according to the invention, as it is produced with the method according to the invention.

In FIG. 1, the reference numeral 1 denotes a cushion according to the invention, which essentially consists of an airtight casing 2 and a filling body 3 that is materially and/or positively connected to the airtight casing 2. The flexible filling body is polydirectionally, air-permeable, i.e. it allows the rapid propagation of pressure differences or pressure waves in the entire cushion 1 to make the deformation of the casing 2 as a result of contact or collision with an object detectable as a pressure increase on a corresponding pressure sensor or evaluation electronics 4 and use this as a control signal for a stationary or autonomously moving handling device, in particular industrial robots, such as a manufacturing, transport, inspection or service robot. The filling body 3 is necessary for the effective build-up of an evaluable pressure change as a result of a contact or a collision, in order to prevent the casing 2 from deflecting elsewhere, in that the filling body stabilizes the casing primarily in the sense of an inward tensile force, as indicated by the inwardly protruding arrows arising from the casing in FIG. 1. On the outside of the casing 2, inserts 5 can be seen which are embedded in the casing 2. An insert 5 is designed, for example, as a fastening element 5' or as a cable clamp 5" to fix the cushion 1 on a robot (not shown) or to receive and guide cables of the evaluation electronics 4 or the robot. The pressure sensor 4 is also embedded in the casing in the form of an insert in the form of a housing part 5'''.

Figure 2:
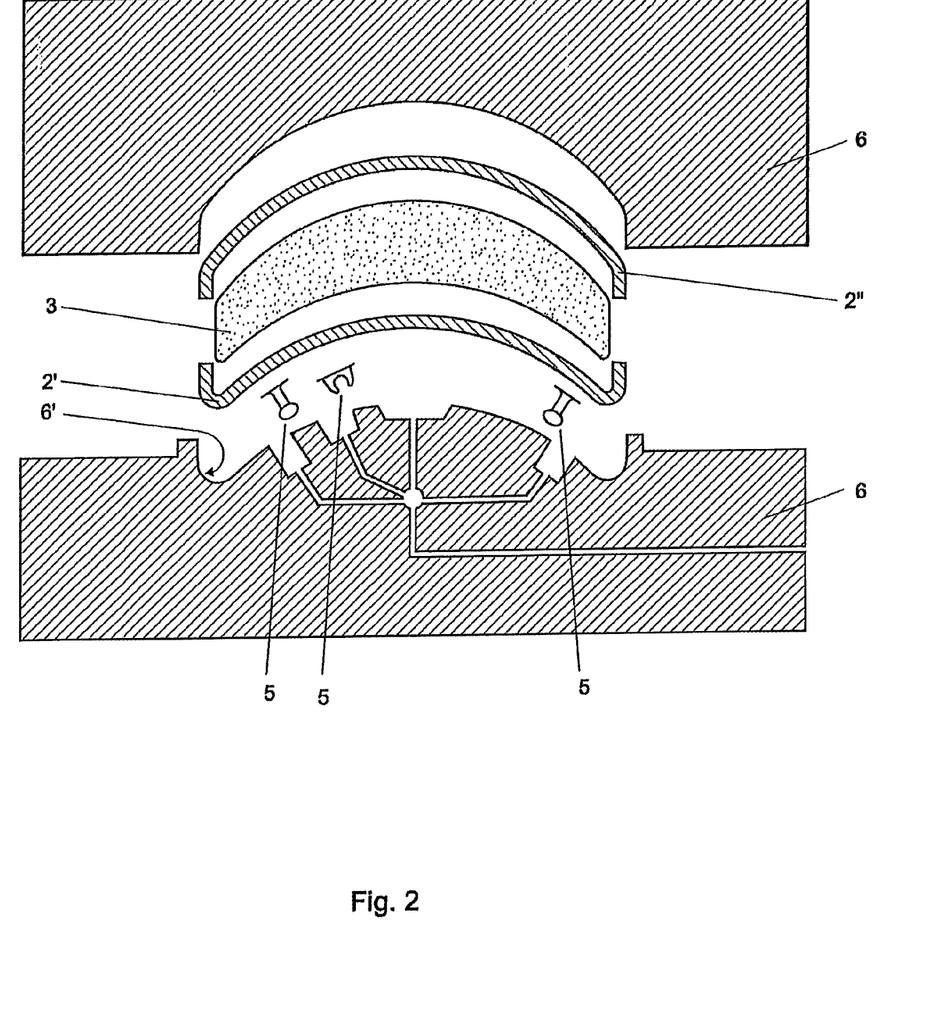
FIG. 2 shows a schematic, exploded view of the parts essential to the invention in their relative position in the method according to the invention.

FIG. 2 shows the method for producing a cushion 1 with a casing 2 made of an airtight and preferably elastic casing material and a flexible, polydirectionally air-permeable filling body 3 arranged in the casing 2, which is materially connected to the casing 2. The shell 2 is produced in the form of a first casing shell 2' and a second casing shell 2" by coating a first mold cavity 6' and a second mold cavity 6" of a two-part molding tool 6 with a curable, flowable and/or sprayable plastic material, preferably polyurethane. Timely before the flowable and/or sprayable plastic material cures, the prefabricated filling body 3 is inserted into the first casing shell 2' located in the first mold cavity. Embedded in the first casing shell 2' are insert parts 5 which are penetrated by the plastic material and are thereby materially and/or positively fixed. In the method according to the invention, the filling body 3 does not yet require an airtight casing on its outside, whereby the filling body 3 can be foamed, for example, as an open-pore foam and rigid foam or cut from a three-dimensional knitted fabric.

Figure 3:
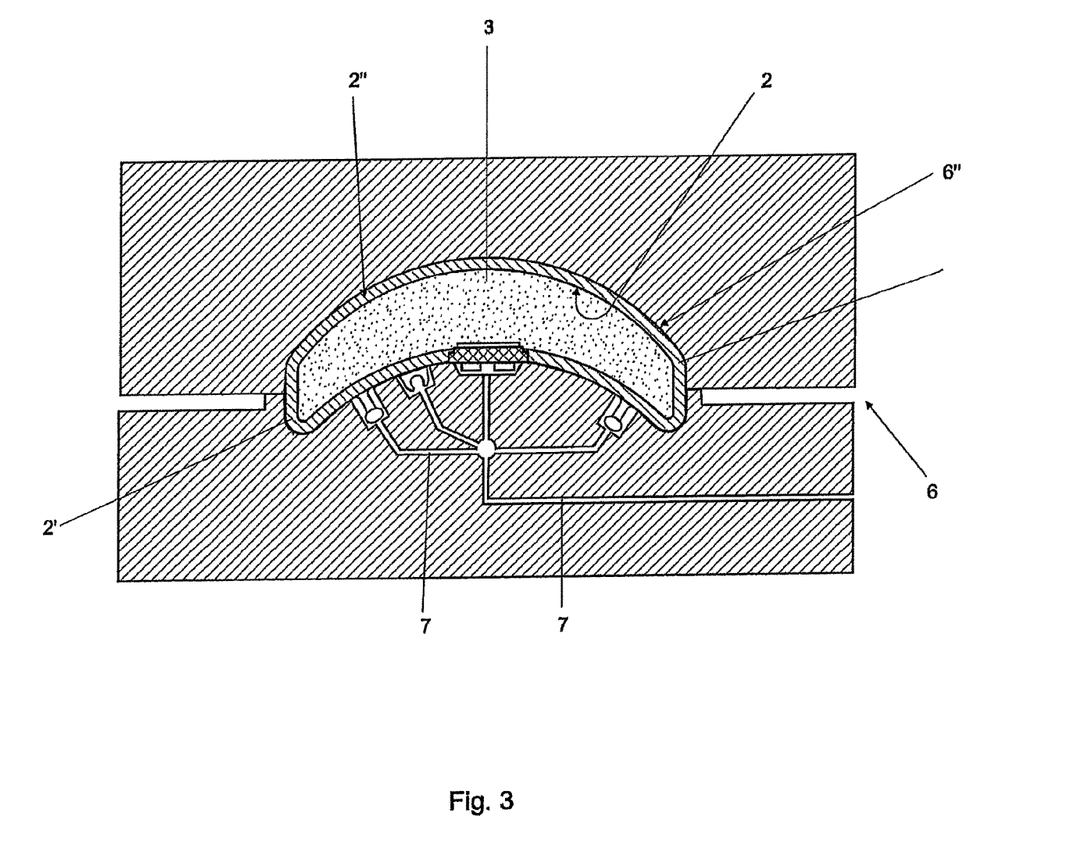
FIG. 3 shows a schematic, combined representation of the parts essential to the invention in their relative position in the method according to the invention.

FIG. 3 shows the process stage in which the first casing shell 2' and second casing shell 2" located in the first mold cavity 6' and the second mold cavity 6" are joined together before the plastic material cures in order to surround the filling body 3 and to connect with the same materially and/or positively. The plastic material now cures and a stable and permanent connection is created between the casing 2 and the filling body 3 and between the casing 2 and the inserts 5, which were already held in place by means of vacuum lines 7 when the mold cavities 6' and 6" were coated.

Figure 4:
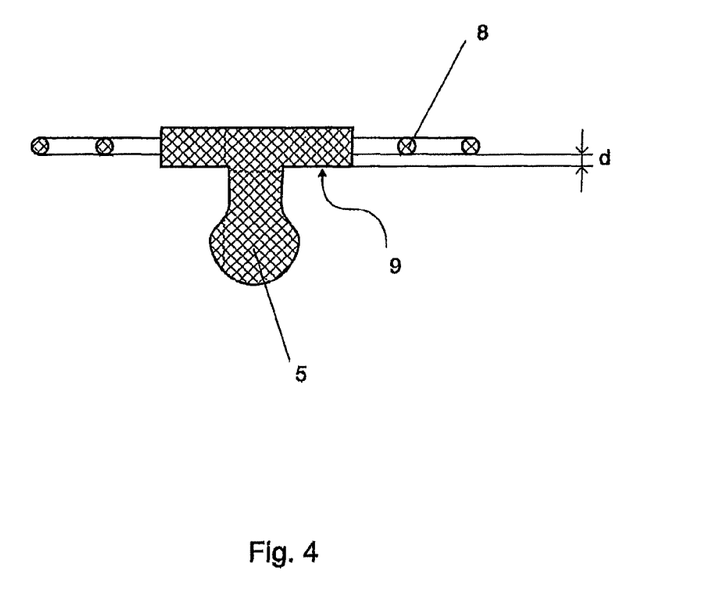
FIG. 4 shows an illustration of an insert

FIG. 4 shows that an insert 5 has a fastening region 8 and a sealing region 9, which is raised with respect to the fastening region 8, wherein the curable, flowable and/or sprayable plastic material penetrates the fastening region 8 up to the level of the sealing region 9.

Figure 5:
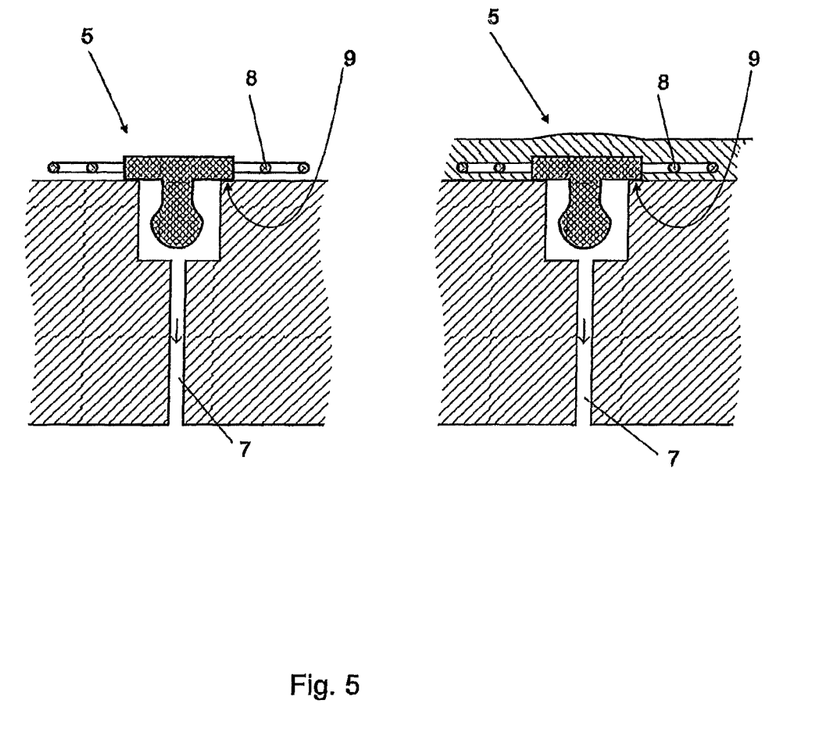
FIG. 5 shows a schematic representation of the embedding of an insert in a casing shell.

As shown in FIG. 5, an insert 5 is held in place by the effect of negative pressure prior to coating in order to prevent the insert 5 from slipping when the mold cavities are coated with the curable, flowable and/or sprayable plastic material. The insert 5 is specifically shaped for this purpose with its sealing region 9 so that the negative pressure can easily be built up and maintained until the plastic material has hardened and the insert 5 is firmly anchored in the casing 2.

Figure 6:
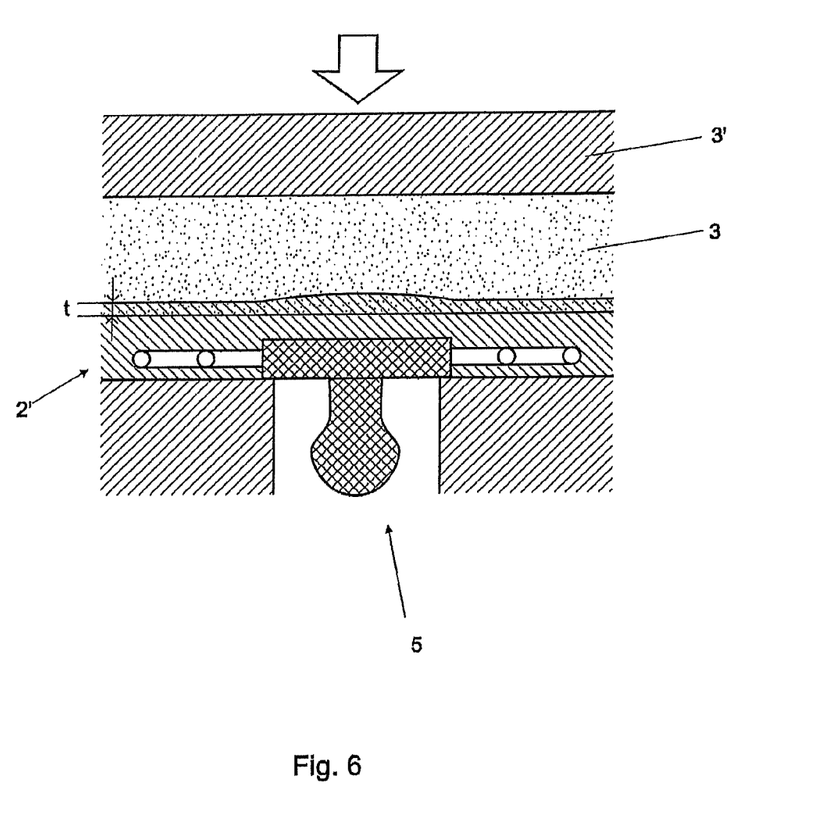
FIG. 6 shows a schematic representation to illustrate how the filling body is pressed when it is inserted into the first casing shell.

FIG. 6 illustrates how the filling body 3 is pressed when it is inserted into the first casing shell 2', which casing shell 2' has not yet cured at this point in time. The flowable and/or sprayable plastic material penetrates into the outermost regions of the filling body 3 and thereby above all allows a form-fitting connection between the casing 2 and the filling body 3. The filling body 3 is pressed into the not yet cured shell 2' with a molding tool 3' for the filling body 3 when it is inserted into the first casing shell 2' in order to ensure a defined penetration depth t into the curable, flowable and/or sprayable plastic material.

Figure 7:
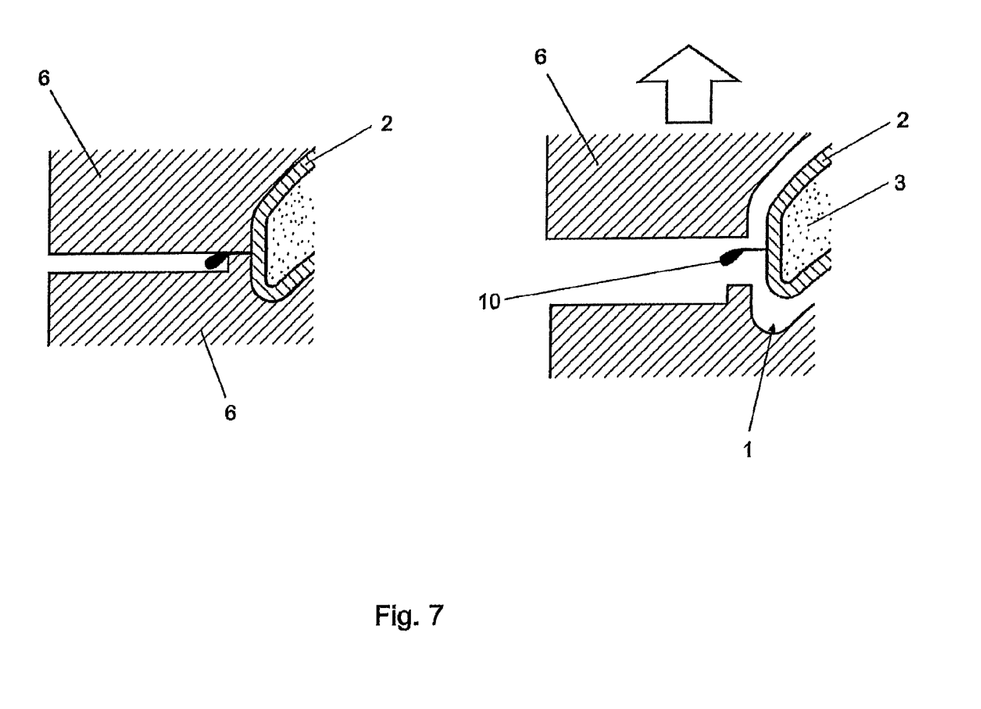
FIG. 7 shows a schematic representation of the separation of a seam of excess plastic material.

FIG. 7 shows that after the plastic material has cured, a seam 10 made of excess plastic material can remain on the outside of the casing 2, but which can easily be separated from the cushion 1 by means of compressed air.

The invention claimed is:

1. A method for producing a cushion with a casing made of an airtight casing material and a flexible, polydirectionally air-permeable filling body which is arranged in the casing and which is materially connected to the casing, wherein the method comprises at least the following steps:
   a) coating a first mold cavity of a molding tool with a curable, flowable and/or sprayable plastic material to form a first casing shell,
   b) coating a second mold cavity of the molding tool with the curable, flowable and/or sprayable plastic material to form a second casing shell,
   c) inserting a pre-produced, flexible, polydirectionally air-permeable filling body into the first casing shell located in the first mold cavity before the curable, flowable and/or sprayable plastic material cures or fully reacts,
   d) after steps a), b) and c), joining together the first and second casing shells located in the first mold cavity and in the second mold cavity before the curable, flowable and/or sprayable plastic material cures or fully reacts, such that the curable, flowable and/or sprayable plastic material of the first and second casing shells penetrates an entire surface on the filling body.

2. The method according to claim 1, wherein the coating of the first mold cavity and the second mold cavity with the curable, flowable and/or sprayable plastic material is accomplished by means of high pressure spraying.

3. The method according to claim 1, wherein polyurethane is used as said curable, flowable and/or sprayable plastic material.

4. The method according to claim 1, wherein the filling body, when being inserted into the first casing shell, is pressed into one of the casing shells with a molding tool for the filling body.

5. The method according to claim 1, wherein before the coating of the first mold cavity with the curable, flowable and/or sprayable plastic material, at least one prefabricated insert is placed in the molding tool for embedding said at least one prefabricated insert in the casing shell during coating.

6. The method according to claim 5, wherein a housing or carrier part for electronic components, a mechanical connecting and/or fastening element and/or a cable clamp is used as said at least one prefabricated insert that is embedded.

7. The method according to claim 5, wherein the at least one prefabricated insert has a flat fastening region through which the curable, flowable and/or sprayable plastic material passes.

8. The method according to claim 7, wherein the at least one prefabricated insert has a sealing region which is raised with respect to the flat fastening region and the curable, flowable and/or sprayable plastic material penetrates the flat fastening region up to a level of the sealing region.

9. The method according to claim 5, wherein, prior to coating, the at least one prefabricated insert is subjected to at least one of the following group: heating, scarfing, and plasma treatment.

10. The method according to claim 5, wherein the at least one prefabricated insert is held in place by the effect of negative pressure prior to coating.

11. The method according to claim 10, wherein the negative pressure is formed by vacuum lines that cross the molding tool.

12. The method according to claim 1, wherein, after the curable, flowable and/or sprayable plastic material has cured, a seam made of excess plastic material is separated from the cushion by means of compressed air.

* * * * *